United States Patent Office 2,809,200
Patented Oct. 8, 1957

2,809,200

N-ACYLATED SUBSTITUTED IMINODIBENZYL DERIVATIVES

Walter Schindler, Riehen, near Basel, and Franz Häfliger, Basel, Switzerland, assignors, by mesne assignments, to Geigy Chemical Corporation, New York, N. Y., a corporation of Delaware No Drawing. Application August 31, 1955, Serial No. 531,816

Claims priority, application Switzerland September 22, 1954

2 Claims. (Cl. 260—294)

The present invention is concerned with new basically acylated substituted iminodibenzyl derivatives which have valuable pharmacological properties and with the production thereof.

Derivatives of nuclear substituted iminodibenzyls, e. g. 3.7-dichloro-iminodibenzyl (3.7-dichloro-10.11-dihydro-5-dibenzo-[b.f]azepine) are new. It has now been found that such compounds of the general formula:

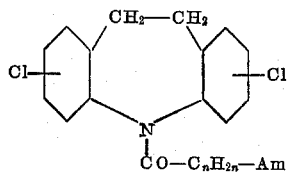

wherein $n$ represents a low whole number, Am represents the radical of a low molecular dialkylamine or an alkylenimino radical with 5–6 ring members as well as the corresponding quaternary ammonium salts, have interesting pharmacological properties, for example, strong local anesthetic and, in some cases, also spasmolytic activity.

These new compounds can be produced by reacting an N-(halogeno-alkanoyl)-dihalogenoiminodibenzyl with a dialkylamine having low molecular alkyl groups or with an alkylenimine with 5–6 ring members (pyrrolidine, piperidine or the C-alkyl substitution products thereof).

The reaction can be performed in an inert solvent such as, for example, benzene or homologues thereof. An excess of the amine used for the reaction can serve to bind the halogen hydracid liberated during the reaction; however also an organic tertiary base such as dimethyl aniline or pyridine, or inorganic acid binding substances such as, e. g. sodium or potassium carbonate, can be used.

The N-(halogen-alkanoyl)-iminodibenzyls necessary as starting materials are easily obtained by acylating the substituted iminodibenzyls with halogen fatty acid halides or also corresponding anhydrides in the presence or absence of, e. g. pyridine, dimethyl aniline etc. The iminodibenzyls substituted according to the definition can be produced for example from the corresponding substituted diamino-dibenzyls by heating with polyphosphoric acid; e. g. 3.7-dichloro-iminodibenzyl from 2.2′-diamino-4.4′-dichloro-dibenzyl by heating at 220–300° with polyphosphoric acid.

Examples of 5-(halogen-alkanoyl)-3.7-dichloro-iminodibenzyls are: chloracetyl-, bromacetyl-, α-chloropropionyl-, α-bromopropionyl-, α-bromobutyryl-, α-bromoisobutyryl-, α-bromovaleryl-, α-bromoisovaleryl-, α-bromocaproyl-3.7-dichloro-iminodibenzyl, β-chloropropionyl-, β-bromopropionyl-, β-chlorobutyryl-, β-bromobutyryl-, β-chloroisobutyryl-, β-bromoisobutyryl-, β-bromovaleryl-, β-bromoisovaleryl-, γ-chlorobutyryl-, γ-chlorovaleryl-, and δ-chlorovaleryl-3.7-dichloro-iminodibenzyl etc. Also the corresponding derivatives of 1.9-dichloro-, or 3.7-dibromo-iminodibenzyl can be used.

These N - (halogen - alkanoyl) - 3.7 - dichloro-iminodibenzyls can be reacted, for example, with dimethylamine, methylethylamine, diethylamine, dipropylamine, di-isopropylamine, dibutyl- and diamyl-amine, methylallylamine, diallylamine, pyrrolidine, piperidine or C-alkylated pyrrolidines or piperidines.

Quaternary compounds result in the usual way from tertiary 5-aminoalkanoyl-dichloro-iminodibenzyls on the addition of halides or sulphates of aliphatic or araliphatic alcohols, e. g. of methyl iodide, dimethyl sulphate, ethyl bromide or benzyl chloride. Such compounds are obtained however, also by the use of tertiary amines of the general formula:

R—Am wherein R represents an alkyl or aralkyl radical and Am has the meaning given above, instead of the secondary amines for the reaction with the 5-(halogen-alkanoyl)-dichloro-iminodibenzyls.

The new compounds form salts with inorganic and organic acids such as, e. g. hydrochloric acid, sulphuric acid, phosphoric acid, tartaric acid, citric acid and salicylic acid, some of which salts dissolve in water with an almost neutral reaction.

The following examples further illustrate the production of the new compounds. Where not otherwise stated, parts are given as parts by weight and their relationship to parts by volume is as that of grammes to cubic centimetres. The temperatures are in degrees centigrade.

*Example 1*

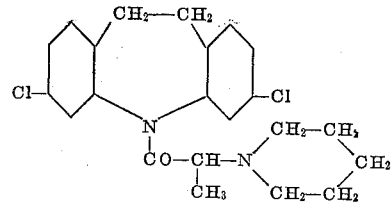

11.5 parts of 3.7-dichloro-iminodibenzyl are dissolved in 50 parts by volume of abs. benzene, 11 parts of α-bromo-propionyl bromide are added and the whole is boiled under reflux for 6 hours. The solvent is then completely distilled off in the vacuum and the residue is recrystallised from ether. 5 - (α-bromo-propionyl) - 3.7-dichloro-iminodibenzyl melts at 164°. 12.4 parts of this product are dissolved in benzene and boiled under reflux for 16 hours with 10 parts of piperidine. The reaction mixture is cooled, diluted with ether and shaken out five times with 10 parts by volume of N-hydrochloric acid each time. The united acid extracts are made alkaline with concentrated ammonia. The reaction product is drawn off under suction and recrystallised from a great deal of alcohol with the addition of a little charcoal. 5-(α-piperidino-propionyl)-3.7-dichloro-iminodibenzyl, (5-(β - piperidino - propionyl)-3.7-dichloro-10.11-dihydro-5-dibenzo[b.f]azepine) melts at 166–167°.

*Example 2*

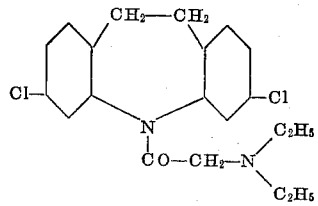

21 parts of 3.7-dichloro-iminodibenzyl are dissolved in 100 parts by volume of benzene, 9 parts by volume of chloracetyl chloride are added and the whole is boiled under reflux for 6 hours. The solvent is then distilled off in the vacuum and the residue is recrystallised from ether. The 5 - chloracetyl - 3.7 - dichloro - iminodibenzyl melts at 142°. 15 parts of this product are boiled under reflux for 16 hours with 50 parts by volume of pure diethylamine. The reaction product is poured into water and shaken out with ether. The base is removed from the ether solutions by shaking out with diluted hydrochloric acid. The united hydrochloric acid extracts are made alkaline with concentrated ammonia and the 5-diethylamino-acetyl-3.7-dichloroiminodibenzyl (5-diethylaminoacetyl - 3.7 - dichloro-10.11-dihydro-5-dibenzo[b.f] azepine) which precipitates is recrystallised from alcohol whereupon it melts at 99–100°.

5-piperidinoacetyl-3.7-dichloro-iminodibenzyl (5-piperidinoacetyl - 3.7 - dichloro - 10.11 - dihydro - dibenzo[b.f] azepine) of the formula:

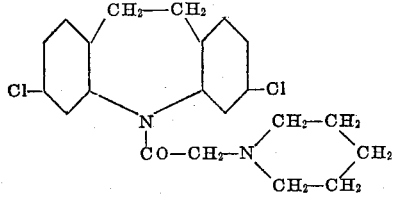

is obtained in an analogous manner. It melts at 105°.

What we claim is:
1. An N-acylated derivative of a substituted iminodibenzyl corresponding to the formula:

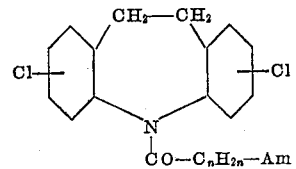

wherein $n$ represents a low whole number, Am represents a member selected from the group consisting of the radical of a dialkylamine having lower alkyl groups and the radical of an alkylene imine with at least 5 and at most 6 ring members.

2. 5 - ($\alpha$ - piperidino - propionyl)-3.7-dichloro-iminodibenzyl.

References Cited in the file of this patent

UNITED STATES PATENTS 2,666,051    Hafliger et al. _____ Jan. 12, 1954